(12) United States Patent
Thusoo et al.

(10) Patent No.: US 7,398,265 B2
(45) Date of Patent: Jul. 8, 2008

(54) EFFICIENT QUERY PROCESSING OF XML DATA USING XML INDEX

(75) Inventors: Ashish Thusoo, Foster City, CA (US); Ravi Murthy, Fremont, CA (US); Sivasankaran Chandrasekar, Palo Alto, CA (US); Nipun Agarwal, Santa Clara, CA (US); Eric Sedlar, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 473 days.

(21) Appl. No.: 10/944,170

(22) Filed: Sep. 16, 2004

(65) Prior Publication Data

US 2005/0229158 A1 Oct. 13, 2005

Related U.S. Application Data

(60) Provisional application No. 60/599,319, filed on Aug. 6, 2004, provisional application No. 60/599,652, filed on Aug. 5, 2004, provisional application No. 60/582,706, filed on Jun. 23, 2004, provisional application No. 60/580,445, filed on Jun. 16, 2004, provisional application No. 60/560,927, filed on Apr. 9, 2004.

(51) Int. Cl.
G06F 17/30 (2006.01)
(52) U.S. Cl. .............................. 707/2; 707/5; 707/104.1; 715/234
(58) Field of Classification Search ........................ None
See application file for complete search history.

(56) References Cited

U.S. PATENT DOCUMENTS

| | | | |
|---|---|---|---|
| 5,404,513 A | 4/1995 | Powers et al. | |
| 5,625,815 A | 4/1997 | Maier et al. | |
| 5,630,125 A | 5/1997 | Zellweger | |
| 5,680,614 A | 10/1997 | Bakuya et al. | |
| 5,924,088 A | 7/1999 | Jakobsson et al. | |
| 5,960,194 A | 9/1999 | Choy et al. | |

(Continued)

FOREIGN PATENT DOCUMENTS

GB        2409078 A        6/2005

(Continued)

OTHER PUBLICATIONS

W3C, "XQuery 1.0: An XML Query Language," W3C Recommendation, Working Draft, Oct. 29, 2004, retrieved from the internet:<http://www.w3.org/TR/2004/WD-xquery-20041029>, retrieved on Apr. 14, 2005, pp. 1-189.

(Continued)

*Primary Examiner*—Leslie Wong
(74) *Attorney, Agent, or Firm*—Hickman Palermo Truong & Becker LLP (57) ABSTRACT

A method and apparatus is provided for translating queries, such as path expressions and SQL/XML constructs, into SQL statements to be executed against an XML index, which improves processor time as opposed to applying path expressions directly to the original XML documents to extract the desired information. Simple path expressions, filter expressions, descendant axes, wildcards, logical expressions, relational expressions, literals, and other path expressions are all translated into SQL for efficient querying of an XML index. Similarly, rules for translating SQL/XML constructs into SQL are provided.

42 Claims, 2 Drawing Sheets

U.S. PATENT DOCUMENTS

| | | | |
|---|---|---|---|
| 5,964,407 A | 10/1999 | Sandkleiva | |
| 5,974,407 A | 10/1999 | Sacks | |
| 5,983,215 A | 11/1999 | Ross et al. | |
| 6,055,544 A | 4/2000 | DeRose et al. | |
| 6,128,610 A | 10/2000 | Srinivasan et al. | |
| 6,141,655 A | 10/2000 | Johnson et al. | |
| 6,208,993 B1 | 3/2001 | Shadmon | |
| 6,253,195 B1 | 6/2001 | Hudis et al. | |
| 6,279,007 B1 | 8/2001 | Uppala | |
| 6,330,573 B1 | 12/2001 | Salisbury et al. | |
| 6,341,289 B1 | 1/2002 | Burroughs et al. | |
| 6,366,902 B1 | 4/2002 | Lyle et al. | |
| 6,381,607 B1 | 4/2002 | Wu et al. | |
| 6,427,123 B1 | 7/2002 | Sedlar | |
| 6,438,562 B1 | 8/2002 | Gupta et al. | |
| 6,470,344 B1 | 10/2002 | Kothuri et al. | |
| 6,487,546 B1 | 11/2002 | Witkowski | |
| 6,496,842 B1 | 12/2002 | Lyness | |
| 6,604,100 B1 | 8/2003 | Fernandez et al. | |
| 6,631,366 B1 | 10/2003 | Nagavamsi et al. | |
| 6,636,845 B2 | 10/2003 | Chau et al. | |
| 6,643,633 B2 | 11/2003 | Chau et al. | |
| 6,654,734 B1 | 11/2003 | Mani et al. | |
| 6,732,222 B1 | 5/2004 | Garritsen et al. | |
| 6,772,350 B1 | 8/2004 | Belani et al. | |
| 6,778,977 B1 | 8/2004 | Avadhanam et al. | |
| 6,782,380 B1 | 8/2004 | Thede | |
| 6,795,821 B2 | 9/2004 | Yu | |
| 6,826,727 B1 | 11/2004 | Mohr et al. | |
| 6,836,857 B2 | 12/2004 | Ten-Hove et al. | |
| 6,965,894 B2 | 11/2005 | Leung et al. | |
| 7,028,028 B1 | 4/2006 | Balmin et al. | |
| 7,031,956 B1 | 4/2006 | Lee et al. | |
| 7,043,488 B1 | 5/2006 | Bauer et al. | |
| 7,043,716 B2 | 5/2006 | Zimmer et al. | |
| 7,047,253 B1 | 5/2006 | Murthy et al. | |
| 7,062,507 B2 | 6/2006 | Wang et al. | |
| 7,089,239 B1 | 8/2006 | Baer et al. | |
| 7,124,137 B2 | 10/2006 | Lin et al. | |
| 7,139,746 B2 * | 11/2006 | Shin et al. | 707/2 |
| 7,162,485 B2 * | 1/2007 | Gottlob et al. | 707/102 |
| 7,181,438 B1 | 2/2007 | Szabo | |
| 2001/0037345 A1 | 11/2001 | Kiernan et al. | |
| 2002/0073019 A1 | 6/2002 | Deaton | |
| 2002/0078068 A1 | 6/2002 | Krishnaprasad et al. | |
| 2002/0095421 A1 | 7/2002 | Koskas | |
| 2002/0100027 A1 | 7/2002 | Binding et al. | |
| 2002/0103829 A1 | 8/2002 | Manning et al. | |
| 2002/0116457 A1 | 8/2002 | Eshleman et al. | |
| 2002/0143512 A1 | 10/2002 | Shamoto et al. | |
| 2002/0156811 A1 | 10/2002 | Krupa | |
| 2002/0184188 A1 | 12/2002 | Mandyam et al. | |
| 2002/0184401 A1 | 12/2002 | Kadel, Jr. et al. | |
| 2002/0188613 A1 | 12/2002 | Chakraborty et al. | |
| 2002/0194157 A1 | 12/2002 | Zait et al. | |
| 2003/0009361 A1 | 1/2003 | Hancock et al. | |
| 2003/0028563 A1 | 2/2003 | Stutz et al. | |
| 2003/0033285 A1 | 2/2003 | Jalali et al. | |
| 2003/0065659 A1 | 4/2003 | Agarwal et al. | |
| 2003/0078906 A1 | 4/2003 | Ten-Hove et al. | |
| 2003/0105732 A1 | 6/2003 | Kagalwala et al. | |
| 2003/0131051 A1 | 7/2003 | Lection et al. | |
| 2003/0200214 A1 | 10/2003 | Doole et al. | |
| 2003/0212662 A1 | 11/2003 | Shin et al. | 707/2 |
| 2003/0212664 A1 | 11/2003 | Breining et al. | |
| 2003/0233618 A1 | 12/2003 | Wan | |
| 2004/0006563 A1 | 1/2004 | Zwiegincew et al. | |
| 2004/0010752 A1 | 1/2004 | Chan et al. | |
| 2004/0015783 A1 | 1/2004 | Lennon et al. | |
| 2004/0064466 A1 | 4/2004 | Manikutty et al. | |
| 2004/0073541 A1 | 4/2004 | Lindblad et al. | |
| 2004/0083222 A1 | 4/2004 | Pecherer | |
| 2004/0088320 A1 | 5/2004 | Perry | |
| 2004/0103105 A1 | 5/2004 | Lindblad et al. | |
| 2004/0143581 A1 | 7/2004 | Bohannon et al. | |
| 2004/0148278 A1 | 7/2004 | Milo et al. | |
| 2004/0167904 A1 | 8/2004 | Wen et al. | |
| 2004/0193575 A1 | 9/2004 | Chen et al. | |
| 2004/0199524 A1 | 10/2004 | Rys et al. | |
| 2004/0205551 A1 | 10/2004 | Santos | |
| 2004/0215600 A1 | 10/2004 | Aridor et al. | |
| 2004/0221226 A1 | 11/2004 | Lin et al. | |
| 2004/0260691 A1 | 12/2004 | Desai et al. | |
| 2004/0267719 A1 | 12/2004 | Doherty et al. | |
| 2004/0267760 A1 | 12/2004 | Brundage et al. | |
| 2005/0004892 A1 | 1/2005 | Brundage et al. | |
| 2005/0022115 A1 | 1/2005 | Baumgartner et al. | |
| 2005/0038688 A1 * | 2/2005 | Collins et al. | 705/9 |
| 2005/0050016 A1 | 3/2005 | Stanoi et al. | |
| 2005/0091188 A1 * | 4/2005 | Pal et al. | 707/1 |
| 2005/0097084 A1 * | 5/2005 | Balmin et al. | 707/3 |
| 2005/0097108 A1 | 5/2005 | Wang et al. | |
| 2005/0102256 A1 | 5/2005 | Bordawekar et al. | |
| 2005/0114314 A1 | 5/2005 | Fan et al. | |
| 2005/0120031 A1 | 6/2005 | Ishii | |
| 2005/0160076 A1 | 7/2005 | Kanemasa | |
| 2005/0160108 A1 | 7/2005 | Charlet et al. | |
| 2005/0210002 A1 | 9/2005 | Pal et al. | |
| 2005/0228792 A1 | 10/2005 | Chandrasekaran et al. | 707/9 |
| 2005/0228818 A1 | 10/2005 | Murthy et al. | |
| 2005/0229158 A1 | 10/2005 | Thusoo et al. | |
| 2005/0289125 A1 | 12/2005 | Liu et al. | |
| 2005/0289138 A1 | 12/2005 | Cheng et al. | |
| 2006/0031204 A1 | 2/2006 | Liu et al. | |
| 2006/0129584 A1 | 6/2006 | Hoang et al. | |

FOREIGN PATENT DOCUMENTS

| | | |
|---|---|---|
| WO | WO 42881 A2 | 6/2001 |
| WO | WO 03/027908 A2 | 4/2003 |

OTHER PUBLICATIONS

W3C, "XML Path Language (XPath) 2.0," W3C Recommendation, Working Draft, Oct. 29, 2004, retrieved from the internet:<http://www.w3.org/TR/2004/WD-xpath20-20041029>, retrieved on Apr. 14, 2005, pp. 1-111.

W3C, "XML Syntax for XQuery 1.0 (XQueryX)," W3C Recommendation, Working Draft, Dec. 19, 2003, retrieved from the internet:<http://www.w3.org/TR/2003/WD-xquery-20031219>, retrieved on Apr. 14, 2005, pp. 1-55.

Lo et al., "XAS: A System for Accessing Componentized, Virtual XML Documents," IEEE, 2001, pp. 493-502.

Zisman et al., "Using XML to Build Consistency Rules for Distributed Specifications," Proceedings of the Tenth International Workshop on Software Specification and Design (IWSD'00), IEEE 2000, 8 pages.

Myllymaki, Jussi, "Effective Wed data Extraction with Standard XML Technologies," WWW10, May 1-5, 2001, pp. 689-696.

Schmidt et al., "Why and How to Benchmark XML Databases," SIGMOND Record, vol. 3, No. 3, Sep. 2001, pp. 27-32.

McHugh, Jason et al., "Query Optimization for XML", XP-002333353, *Proceedings of the 25th VLDB Conference* (1999) pp. 315-326.

Yoshikawa, Masatoshi et al., "XRel: A Path-Based Approach to Storage and Retrieval of XML Documents Using Relationship Databases", XP-001143686, *ACM Transactions on Internet Technology* (2001), pp. 110-141.

Notification of Transmittal of the International Search Report and the Written Opinion of the International Searching Authority, or the Declaration received from International application No. PCT/US2005/011762.

Pending claims from International application No. PCT/US2005/011762.

International Searching Authority, "Notification of Transmittal of the International Search Report and the Written Opinion of the International Searching Authority, or the Declaration," PCT/US2005/011763, dated Aug. 6, 2005, 12 pages.

Current Claims, PCT/US2005/011763, 4 pages.

Cooper, Brian F. et al., "A Fast Index for Semistructured Data," Proceeding of the International Conference on Very Large Databases, 2001, XP-002303292, pp. 341-350.

McHugh, Jason, et al. "Indexing Semistructured Data," Stanford Science Department, 1998, XP-002248313, pp. 1-21.

International Searching Authority, "Notification of the Transmittal of the International Search Report and the Written Opinion of the International Searching Authority, or the Declaration," PCT/US2005/020795, Mailing Date Sep. 27, 2005, 13 pages.

Current Claims, PCT/US2005/020795, 5 pages.

Kudrass, Thomas, "Management of XML Documents Without Schema in Relational Database Systems," Information and Software Technology, vol. 44, No. 4, Mar. 31, 2002, XP-004347776, pp. 269-275.

Zhang, Wansong, et al., "An Encoding Scheme for Indexing XML Data," E-Commerce and E-Service, 2004, XP-010697639, pp. 526-529.

"Written Opinion of the International Preliminary Examining Authority" in International application No. PCT/US2005/020795.

"XML Fragment Interchange" *W3C* (1998) pp. 1-16.

Katz, Howard et al., "Integrating XQuery and Relational Database Systems," Chapter 7—*XQuery from the Experts: A Guide to the W3C XML Query Language*, Addison Wesley Professional, Aug. 22, 2003, ISBM 978-0-321-18060-5, pp. 353-391.

Zemke, Fred, "XMLQuery," Change Proposal, ISO/IEC JTC1/SC32 WG3:SIA-nnn ANSI NCITS H2-2004-021rl, Mar. 14, 2004, 29 pages.

International Preliminary Examining Authority, "Notification of Transmittal of the International Preliminary Report of Patentability," PCT/US2005/020795, dated Aug. 7, 2006, 10 pages.

International Preliminary Examining Authority, "Written Opinion of the International Preliminary Examining Authority," PCT/US2005/020795, received May 31, 2006, 5 pages.

Claims, PCT/US2005/020795, 3 pages.

W3C, "XML Fragment Interchange," W3C Working Draft, Jun. 30, 1999, XP-002167090, 17 pages.

International Preli minary Examining Authority, "Written Opinion," PCT/US2005/021259, dated Oct. 13, 2006, 7 pages.

Current Claims, PCT/US2005/021259, 10 pages.

MacKenzie, David et al., "Finding Files", GNU Findutils Version 4.1.2, Nov. 1994, 38 pages.

International Searching Authority, "Notification of Transmittal of the International Search Report and the Written Opinion of the International Searching Authority, or the Declaration," PCT/US2005/021259, dated Nov. 24, 2005, 13 pages.

Current Claims, PCT/US2005/021259, 12 pages.

Choi, Byron et al., "The XQuey Formal Semantics: A Foundation for Implementation Optimization," May 31, 2002, IEEE XP-002353605, 15 pages.

Funderbunk, J. et al., "XML programming with SQL/XML and XQuery", *IBM Systems Journal*, XP-002295973 (2002), pp. 642-665.

Kang, Ji-Hoon et al., "An XQuery Engine for Digital Library Systems that support XML data," Proceedings of the 2004 International Symposium on Application and the Internet Workshops, IEEE XP-0010684128, 5 pages.

Murthy, Ravi et al., "XML Schemas in Oracle XML DB," Proceedings of the 29th VLDB Conference, 2003, XP-002353604, pp. 1009-1018.

Shanmugasundaram, Jayavel, et al., "Querying XML Views of Relational Data," Proceedings of the 27$^{th}$ Very Large Databases Conference, Rome, Italy, Sep. 2001, pp. 261-270.

Zhang, Hui et al., "XQuery rewriting at the relational algebra level," Computer Systems Science and Engineering, vol. 18, No. 5, Sep. 2003, IEEE XP-009056809, pp. 241-262.

Zhang, Xin et al., "Honey, I Shrunk the XQuery!—An XML Algebra Optimization Approach," Submission for WIDM'02, IEEE XP-002316448, 14 pages.

European Patent Office, "Communication Pursuant to Article 96(2) EPC," EP App. No. 02799692.5, dated Jan. 18, 2006, 5 pages.

Current Claims PCT/US02/31168, EP App. No. 02799692.5, 8 pages, Jun. 16, 2004.

International Preliminary Examining Authority, "Notification of Transmittal of the International Preliminary Report on Patentability," PCT/US2005/021259, dated Feb. 2, 2007, 9 pages.

Claims, PCT/US2005/021259, dated Nov. 30, 2006, 8 pages (attached).

Rys, Michael et al., "Integrating XQuery and Relational Database Systems," Chapter 7—*XQuery from the Experts: A Guide to the W3C XML Query Language*, Addison Wesley Professional, Aug. 22, 2003, ISBN 978-0-321-18060-5, pp. 353-391.

Daniele Braga et al., "A Graphical Environment to Query XML Data with Query," Proceedings of the Fourth International Conference on Web Information Systems Engineering (WISE '03), 2003, IEEE, 10 pages.

Jurgens, Marcus, et al., "PISA: Performance Models for Index Structures with and without Aggregated data" German Research Society, 1999, 7 pages.

Pal, Shankar et al., "Indexing XML Data Stored in a Relational Database", Proceedings of the 30$^{th}$ VLDB Conference, 2004, 12 pages.

* cited by examiner

EFFICIENT QUERY PROCESSING OF XML DATA USING XML INDEX

PRIORITY CLAIM

This application claims priority to U.S. Provisional Patent Application Ser. No. 60/560,927, entitled XML INDEX FOR XML DATA STORED IN VARIOUS STORAGE FORMATS, filed on Apr. 9, 2004, the contents of which are herein incorporated by reference in their entirety for all purposes.

This application claims priority to U.S. Provisional Patent Application No. 60/580,445 entitled XML INDEX FOR XML DATA STORED IN VARIOUS STORAGE FORMATS, filed on Jun. 16, 2004, the contents of which are herein incorporated by reference in their entirety for all purposes.

This application claims priority to U.S. Provisional Patent Application Ser. No. 60/582,706, entitled TECHNIQUES FOR PROCESSING XQUERY QUERIES IN A RELATIONAL DATABASE MANAGEMENT SYSTEM, filed on Jun. 23, 2004, the contents of which are herein incorporated by reference in their entirety for all purposes.

This application is related to U.S. patent application Ser. No. 10/884,311, entitled INDEX FOR ACCESSING XML DATA, filed on Jul. 2, 2004, the contents of which are herein incorporated by reference in their entirety for all purposes.

This application is related to U.S. patent application Ser. No. 10/944,171, entitled MECHANISM FOR EFFICIENTLY EVALUATING OPERATOR TREES, filed on Sep. 16, 2004, the contents of which are herein incorporated by reference in their entirety for all purposes.

This application is related to U.S. patent application Ser. No. 10/944,177, entitled INDEX MAINTENANCE FOR OPERATIONS INVOLVING INDEXED XML DATA, filed on Sep. 16, 2004, the contents of which are herein incorporated by reference in their entirety for all purposes.

This application is related to U.S. Provisional Patent Application Ser. No. 60/599,319, entitled EFFICIENT EVALUATION OF QUERIES USING TRANSLATION, filed on Aug. 6, 2004, the contents of which are herein incorporated by reference in their entirety for all purposes.

This application is related to U.S. Provisional Patent Application Ser. No. 60/599,652, entitled PROCESSING QUERIES AGAINST ONE OR MORE MARKUP LANGUAGE SOURCES, filed on Aug. 5, 2004, the contents of which are herein incorporated by reference in their entirety for all purposes.

FIELD OF THE INVENTION

The present invention relates to accessing an XML index and, more specifically, to translating expressions and constructs into SQL for accessing an XML index.

BACKGROUND

There are many database systems that allow storage and querying of eXtensible Markup Language data ("XML data"). Though there are many evolving standards for querying XML, all of them include some variation of XPath. XPath allows XML data to be queried based on path expressions. A path expression is any expression that specifies a path through the hierarchical structure of an XML document. The portion of an XML document identified by a path expression is the portion that resides, within the structure of the XML document, at the end of any path that matches the path expression.

A query that uses a path expression to identify one or more specific pieces XML data is referred to herein as a path-based query. The process of determining which XML data corresponds to the path designated in a path-based query is referred to as "evaluating" the path expression.

Unfortunately, even database systems that have built-in support for storing XML data are usually not optimized to handle path-based queries, and the query performance of the database systems leaves much to be desired. In specific cases where an XML schema definition may be available, the structure and data types used in XML instance documents may be known. However, in cases where an XML schema definition is not available, and the documents to be searched do not conform to any schema, there are no efficient techniques for querying using path-based queries.

Without XML indexes, path expressions were directly evaluated against the base tables. As a result, the processing of these expressions involved a complete scan of the base tables. Each scanned row was tested to ascertain whether it satisfied the path expression. Moreover, the evaluation of the path expression was typically done in a functional way manner by constructing a DOM (memory data structure) and traversing the DOM tree while evaluating the path.

Based on the foregoing, there is a clear need to improve the processing time of path-based queries by providing a way for path-based queries to retrieve data from XML documents without incurring the problems associated with a complete scan of the base tables and construction of expensive memory data structures.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figure of the accompanying drawing and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

XML Indexes

U.S. patent application Ser. No. 10/884,311, entitled INDEX FOR ACCESSING XML DATA, filed on Jul. 2, 2004, describes various embodiments of an index that may be used to efficiently access XML documents, managed by a relational database server, based on path-based queries.

Indexes for accessing XML data, such as the indexes disclosed in '311, shall be referred to herein as XML indexes.

An XML index provides a mechanism for indexing paths, values, and order information in XML documents. The actual XML data itself can reside in any form, like CLOB (character large object storing the actual XML text), O-R (object relational structured form in the presence of an XML schema), or BLOB (binary large object storing some binary form of the XML data). In one embodiment, an XML index consists of three logical structures that include a path index, an order index, and a value index, and can reside in a single table, hereinafter path_table.

For the purpose of explanation, the techniques described herein are described in a context in which an XML index, as described in U.S. patent application Ser. No. 10/884,311, is used to index the XML documents. However, the techniques are not limited to any specific index structure or mechanism.

Example XML Documents

For the purpose of explanation, examples shall be given hereafter with reference to the following two XML documents:

```
po1.xml

<PurchaseOrder>
    <Reference>SBELL-2002100912333601PDT</Reference>
    <Actions>
        <Action>
            <User>SVOLLMAN</User>
        </Action>
    </Actions>
    ....
</PurchaseOrder>
po2.xml <PurchaseOrder>
    <Reference>ABEL-20021127121040897PST</Reference>
    <Actions>
        <Action>
            <User>ZLOTKEY</User>
        </Action>
        <Action>
            <User>KING</User>
        </Action>
    </Actions>
    ....
</PurchaseOrder>
```

As indicated above, po1.xml and po2.xml are merely two examples of XML documents. The techniques described herein are not limited to XML documents having any particular types, structure or content. Examples shall be given hereafter of how such documents would be indexed and accessed according to various embodiments of the invention.

The XML Index

According to one embodiment, an XML index is a domain index that improves the performance of queries that include Xpath-based predicates and/or Xpath-based fragment extraction. An XML index can be built, for example, over both XML Schema-based as well as schema-less XML Type columns which are stored either as CLOB or structured storage. In one embodiment, an XML index is a logical index that results from the cooperative use of a path index, a value index, and an order index.

The path index provides the mechanism to lookup fragments based on simple (navigational) path expressions. The value index provides the lookup based on value equality or range. There could be multiple secondary value indexes—one per datatype. The order index associates hierarchical ordering information with indexed nodes. The order index is used to determine parent-child, ancestor-descendant and sibling relationships between XML nodes.

When the user submits a query involving XPaths (as predicate or fragment identifier), the user XPath is decomposed into a SQL query that accesses the XML index table. The generated query typically performs a set of path, value and order-constrained lookups and merges their results appropriately.

The PATH Table

According to one embodiment, a logical XML index includes a PATH table, and a set of secondary indexes. As mentioned above, each indexed XML document may include many indexed nodes. The PATH table contains one row per indexed node. For each indexed node, the PATH table row for the node contains various pieces of information associated with the node.

According to one embodiment, the information contained in the PATH table includes (1) a PATHID that indicates the path to the node, (2) "location data" for locating the fragment data for the node within the base structures, and (3) "hierarchy data" that indicates the position of the node within the structural hierarchy of the XML document that contains the node. Optionally, the PATH table may also contain value information for those nodes that are associated with values. Each of these types of information shall be described in greater detail below.

PATHS

The structure of an XML document establishes parent-child relationships between the nodes within the XML document. The "path" for a node in an XML document reflects the series of parent-child links, starting from a "root" node, to arrive at the particular node. For example, the path to the "User" node in po2.xml is /PurchaseOrder/Actions/Action/User, since the "User" node is a child of the "Action" node, the "Action" node is a child of the "Actions" node, and the "Actions" node is a child of the "PurchaseOrder" node.

The set of XML documents that an XML index indexes is referred to herein as the "indexed XML documents". According to one embodiment, an XML index may be built on all of the paths within all of the indexed XML documents, or a subset of the paths within the indexed XML documents. Techniques for specifying which paths are indexed are described hereafter. The set of paths that are indexed by a particular XML index are referred to herein as the "indexed XML paths".

PATH IDS

According to one embodiment, each of the indexed XML paths is assigned a unique path ID. For example, the paths that exist in po1.xml and po2.xml may be assigned path IDs as illustrated in the following table:

| PATH ID | PATH |
|---|---|
| 1 | /PurchaseOrder |
| 2 | /PurchaseOrder/Reference |

| PATH ID | PATH |
|---|---|
| 3 | /PurchaseOrder/Actions |
| 4 | /PurchaseOrder/Actions/Action |
| 5 | /PurchaseOrder/Actions/Action/User |

Various techniques may be used to identify paths and assign path IDs to paths. For example, a user may explicitly enumerate paths, and specify corresponding path IDs for the paths thus identified. Alternatively, the database server may parse each XML document as the document is added to the set of indexed XML documents. During the parsing operation, the database server identifies any paths that have not already been assigned a path ID, and automatically assigns new path IDs to those paths. The pathid-to-path mapping may be stored within the database in a variety of ways. According to one embodiment, the pathid-to-path mapping is stored as metadata separate from the XML indexes themselves.

According to one embodiment, the same access structures are used for XML documents that conform to different schemas. Because the indexed XML documents may conform to different schemas, each XML document will typically only contain a subset of the paths to which pathids have been assigned.

Location Data

The location data associated with a node indicates where the XML document that contains the node resides within the base structures. Thus, the nature of the location data will vary from implementation to implementation based on the nature of the base structures. Depending on how the actual XML document is stored, the location data may also include a locator or logical pointer to point into the XML document. The logical pointer may be used for extracting fragments that are associated with nodes identified by XPaths.

For the purpose of explanation, it shall be assumed that (1) the base structures are tables within a relational database, and (2) each indexed XML document is stored in a corresponding row of a base table. In such a context, the location data for a node may include, for example, (1) the rowid of row, within the base table, in which the XML document containing the node is stored, and (2) a locator that provides fast access within the XML document, to the fragment data, that corresponds to the node.

Hierarchy Data

The PATH table row for a node also includes information that indicates where the node resides within the hierarchical structure of the XML document containing the node. Such hierarchical information is referred to herein as the "OrderKey" of the node.

According to one embodiment, the hierarchical order information is represented using a Dewey-type value. Specifically, in one embodiment, the OrderKey of a node is created by appending a value to the OrderKey of the node's immediate parent, where the appended value indicates the position, among the children of the parent node, of that particular child node.

For example, assume that a particular node D is the child of a node C, which itself is a child of a node B that is a child of a node A. Assume further that node D has the OrderKey 1.2.4.3. The final "3" in the OrderKey indicates that the node D is the third child of its parent node C. Similarly, the 4 indicates that node C is the fourth child of node B. The 2 indicates that Node B is the second child of node A. The leading 1 indicates that node A is the root node (i.e. has no parent).

As mentioned above, the Orderkey of a child may be easily created by appending to the OrderKey of the parent a value that corresponds to the number of the child. Similarly, the OrderKey of the parent is easily derived from the OrderKey of the child by removing the last number in the Orderkey of the child.

According to one embodiment, the composite numbers represented by each OrderKey are converted into byte-comparable values, so that a mathematical comparison between two OrderKeys indicates the relative position, within the structural hierarchy of an XML document, of the nodes to which the OrderKeys correspond.

For example, the node associated with the OrderKey 1.2.7.7 precedes the node associated with the OrderKey 1.3.1 in the hierarchical structure of an XML document. Thus, the database server uses a conversion mechanism that converts OrderKey 1.2.7.7 to a first value, and to convert OrderKey 1.3.1 to a second value, where the first value is less than the second value. By comparing the second value to the first value, the database server can easily determine that the node associated with the first value precedes the node associated with the second value. Various conversion techniques may be used to achieve this result, and the invention is not limited to any particular conversion technique.

Value Information

Some nodes within an indexed document may be attribute nodes or nodes that correspond to simple elements. According to one embodiment, for attribute nodes and simple elements, the PATH table row also stores the actual value of the attributes and elements. Such values may be stored, for example, in a "value column" of the PATH table. The secondary "value indexes", which shall be described in greater detail hereafter, are built on the value column.

PATH Table Example

According to one embodiment, the PATH table includes columns defined as specified in the following table:

| Column Name | Datatype | Description |
|---|---|---|
| PATHID | RAW(8) | ID for the path token. Each distinct path e.g. /a/b/c is assigned a unique id by the system. |
| RID | UROWID/ ROWID | Rowid of the row in base table. |
| ORDER_KEY | RAW(100) | Dewey order key for the node e.g. 3.21.5 to indicate $5^{th}$ child of $21^{st}$ child of $3^{rd}$ child of root. |
| LOCATOR | RAW(100) | Information corresponding to the starting position for the fragment. This is used during fragment extraction. |
| VALUE | RAW(2000)/ BLOB | Value of the node in case of attributes and simple elements. The type can be specified by the user (as well as the size of the RAW column) |

As explained above, the PATHID is a number assigned to the node, and uniquely represents a fully expanded path to the node. The ORDER_KEY is a system representation of the DEWEY ordering number associated with the node. According to one embodiment, the internal representation of the order key also preserves document ordering.

The VALUE column stores the effective text value for simple element (i.e. no element children) nodes and attribute nodes. According to one embodiment, adjacent text nodes are coalesced by concatenation. As shall be described in greater detail hereafter, a mechanism is provided to allow a user to customize the effective text value that gets stored in VALUE column by specifying options during index creation e.g. behavior of mixed text, whitespace, case-sensitive, etc can be customized. The user can store the VALUE column in any number of formats, including a bounded RAW column or a BLOB. If the user chooses bounded storage, then any overflow during index creation is flagged as an error.

The following table is an example of a PATH table that (1) has the columns described above, and (2) is populated with entries for po1.xml and po2.xml. Specifically, each row of the PATH table corresponds to an indexed node of either po1.xml or po2.xml. In this example, it is assumed that po1.xml and po2.xml are respectively stored at rows R1 and R2 of a base table.

POPULATED PATH TABLE

| rowid | Pathid | Rid | OrderKey | Locator | Value |
|---|---|---|---|---|---|
| 1 | 1 | R1 | 1 | | |
| 2 | 2 | R1 | 1.1 | | SBELL-2002100912333601PDT |
| 3 | 3 | R1 | 1.2 | | |
| 4 | 4 | R1 | 1.2.1 | | |
| 5 | 5 | R1 | 1.2.1.1 | | SVOLLMAN |
| 6 | 1 | R2 | 1 | | |
| 7 | 2 | R2 | 1.1 | | ABEL-20021127121040897PST |
| 8 | 3 | R2 | 1.2 | | |
| 9 | 4 | R2 | 1.2.1 | | |
| 10 | 5 | R2 | 1.2.1.1 | | ZLOTKEY |
| 11 | 4 | R2 | 1.2.2 | | |
| 12 | 5 | R2 | 1.2.2.1 | | KING |

In this example, the rowid column stores a unique identifier for each row of the PATH table. Depending on the database system in which the PATH table is created, the rowid column may be an implicit column. For example, the disk location of a row may be used as the unique identifier for the row. As shall be described in greater detail hereafter, the secondary Order and Value indexes use the rowid values of the PATH table to locate rows within the PATH table.

In the embodiment illustrated above, the PATHID, ORDERKEY and VALUE of a node are all contained in a single table. In alternative embodiment, separate tables may be used to map the PATHID, ORDERKEY and VALUE information to corresponding location data (e.g. the base table Rid and Locator).

Secondary Indexes

The PATH table includes the information required to locate the XML documents, or XML fragments, that satisfy a wide range of queries. However, without secondary access structures, using the PATH table to satisfy such queries will often require full scans of the PATH table. Therefore, according to one embodiment, a variety of secondary indexes are created by the database server to accelerate the queries that (1) perform path lookups and/or (2) identify order-based relationships. According to one embodiment, the following secondary indexes are created on the PATH table.

PATHID_INDEX on (pathid, rid)
ORDERKEY_INDEX on (rid, order_key)
VALUE INDEXES
PARENT_ORDERKEY_INDEX on (rid, SYS_DEWEY_PARENT(order_key))

PATHID_INDEX

The PATHID_INDEX is built on the pathid, rid columns of the PATH table. Thus, entries in the PATHID_INDEX are in the form (keyvalue, rowid), where keyvalue is a composite value representing a particular pathid/rid combination, and rowid identifies a particular row of the PATH table.

When (1) the pathid of a node and (2) the base table row are known, the PATHID_INDEX may be used to quickly locate the row, within the PATH table, for the node. For example, based on the key value "3.R1", the PATHID_INDEX may be traversed to find the entry that is associated with the key value "3.R1". Assuming that the PATH table is populated as illustrated above, the index entry would have a rowid value of 3. The rowid value of 3 points to the third row of the PATH table, which is the row for the node associated with the pathid 3 and the rid R1.

The ORDERKEY_INDEX

The ORDERKEY_INDEX is built on the rid and orderkey columns of the PATH table. Thus, entries in the ORDERKEY_ INDEX are in the form (keyvalue, rowid), where keyvalue is a composite value representing a particular rid/orderkey combination, and rowid identifies a particular row of the PATH table.

When (1) the base table row and (2) the orderkey of a node are known, the ORDERKEY_INDEX may be used to quickly locate the row, within the PATH table, for the node. For example, based on the key value "R1.'1.2'", the ORDERKEY_ INDEX may be traversed to find the entry that is associated with the key value "R1.'1.2'". Assuming that the PATH table is populated as illustrated above, the index entry would have a rowid value of 3. The rowid value of 3 points to the third row of the PATH table, which is the row for the node associated with the orderkey 1.2 and the rid R1.

The Value Indexes

Just as queries based on path lookups can be accelerated using the PATHID_INDEX, queries based on value lookups can be accelerated by indexes built on the value column of the PATH table. However, the value column of the PATH table can hold values for a variety of data types. Therefore, according to one embodiment, a separate value index is built for each data type stored in the value column. Thus, in an implementation in which the value column holds strings, numbers and timestamps, the following value (secondary) indexes are also created:

STRING_INDEX on SYS_XMLVALUE_TO_STRING (value)
NUMBER_INDEX on SYS_XMLVALUE_TO_NUMBER(value)
TIMESTAMP_INDEX on SYS_XMLVALUE_TO_TIMESTAMP(value)

These value indexes are used to perform datatype based comparisons (equality and range). For example, the NUMBER value index is used to handle number-based comparisons within user Xpaths. Entries in the NUMBER_INDEX may, for example, be in the form (number, rowid), where the rowid points to a row, within the PATH table, for a node associated with the value of "number". Similarly, entries within the STRING_INDEX may have the form (string, rowid), and entries within the TIMESTAMP_INDEX may have the form (timestamp, rowid).

The format of the values in the PATH table may not correspond to the native format of the data type. Therefore, when using the value indexes, the database server may call conversion functions to convert the value bytes from stored format to the specified datatype. In addition, the database server applies any necessary transformations, as shall be described hereafter. According to one embodiment, the conversion functions operate on both RAW and BLOB values and return NULL if the conversion is not possible.

By default, the value indexes are created when the XML index is created. However, users can suppress the creation of one or more of value indexes based on the knowledge of query workload. For example, if all XPath predicates involve string comparisons only, the NUMBER and TIMESTAMP value indexes can be avoided.

PARENT_ORDERKEY_INDEX

According to one embodiment, the set of secondary indexes built on the PATH table include a PARENT_ORDERKEY_INDEX. Similar to the ORDER_KEY index, the PARENT_ORDERKEY_INDEX is built on the rid and order_key columns of the PATH table. Consequently, the index entries of the PARENT_ORDERKEY_INDEX have the form (keyvalue, rowid), where keyvalue is a composite value that corresponds to a particular rid/order_key combination. However, unlike the ORDER_KEY index, the rowid in a PARENT_ORDERKEY_INDEX entry does not point to the PATH table row that has the particular rid/order_key combination. Rather, the rowid of each PARENT_ORDERKEY_INDEX entry points to the PATH table row of the node that is the immediate parent of the node associated with the rid/order_key combination.

For example, in the populated PATH table illustrated above, the rid/order_key combination "R1.'1.2'" corresponds to the node in row 3 of the PATH table. The immediate parent of the node in row 3 of the PATH table is the node represented by row 1 of the PATH table. Consequently, the PARENT_ORDERKEY_INDEX entry associated with the "R1.'1.2'" key value would have a rowid that points to row 1 of the PATH table.

Using the XML Index for Path Expression Evaluation

As described above, an XML index indexes nodes, within XML documents, based on the paths to the nodes. The following are examples of path expressions that a path-based query may include:
/po/action/action
/po[id="abc"]
/po//action The path components contained in the XML index may be used to efficiently evaluate path expressions. Typically, evaluating path expressions from the indexed path components is much faster than evaluating path expressions against the base tables, which would result in a complete scan of the original XML documents.

As shall be described in more detail hereafter, techniques are provided for rewriting path expressions, such as those contained within path-based queries, to access the XML index. According to one embodiment, the techniques involve identifying a path specified in the input query, identifying a template that corresponds to the format of the specified path, and generating, based on rules associated with the template, an "index-enabled" query that uses the XML index to locate the XML data that corresponds to the specified path. The index-enabled query may be, for example, a SQLX query (a SQL query that may include XML-specific operators).

More specifically, the techniques may involve (1) decomposing a generic path expression into simpler components such as simple paths, predicates, and structural joins; (2) generating a SQL query against tables of the XML index, which may involve expressing the structural joins using SQL predicates on Dewey order keys of the indexed paths components; and (3) fragment extraction using locators that point to the original data in an efficient way. Using fragment extraction, the database server uses the XML index to return the locators, and the actual XML data at the locators, that need to be read and supplied to the user.

Translation of Path Expressions

The following templates define how, in one embodiment, index-enabled queries are generated based on path expressions, where the index-enabled queries access the path_table of the XML index. As mentioned above, the path expression of a path-based query, or fragments thereof, are matched against templates. Each template is associated with a rule. When a fragment of a specified path is in a format that matches a template, the corresponding rule is then used to generate SQL for an index-enabled query.

Figure 2:
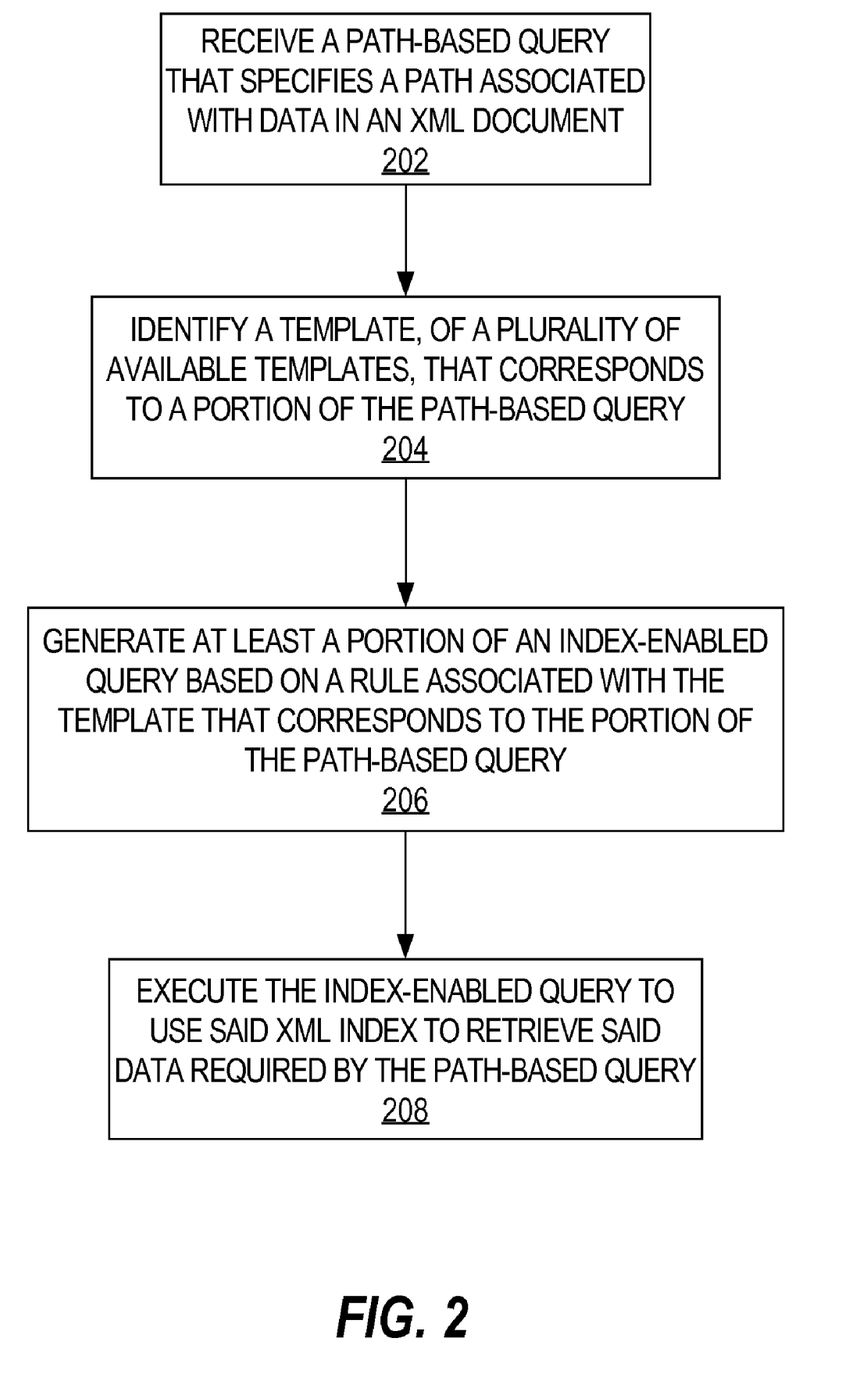
FIG. 2 is a flow diagram that illustrates a method for handling a path-based query, according to an embodiment of the invention.

FIG. 2 is a flow diagram that illustrates a method for handling a path-based query, according to an embodiment of the invention. In step 202, a path-based query that specifies a path associated with data in an XML document is received. In step 204, a template, of a plurality of available templates, that corresponds to a portion of the path-based query is identified. In step 206, at least a portion of an index-enabled query is generated based on a rule associated with the template. At step 208, the index-enabled query is executed to use the XML index to retrieve the data required by the path-based query.

Templates, and the corresponding rules, of one embodiment are described in detail hereafter. The templates given as examples hereafter include templates that correspond to simple path expressions, filter expressions, descendant axis expressions, wildcard expressions, logical expressions, relational expressions, literals, casting nodesets to Boolean expressions, and text functions. The translation of path expressions into SQL for accessing the path_table of the XML index is not limited to the specific examples given hereafter. The templates are simply examples of how, in one embodiment, such translation may be performed.

Simple Path Expressions

Simple paths are expressions of the type "/a/b/c" which have no other axes apart from child axes and which do not have any filters on the axis paths. Simple paths, such as "/a/b/c," are rewritten, according to one embodiment, to the following SQL:

```
/a/b/c →
select pt1.pathid, pt1.rid, pt1.order_key, pt1.locator, pt1.value
from path_table pt1
where pt1.pathid = :B1
``` where:B1=pathid('/a/b/c'), and where the function pathid( ) denotes an internal function used to lookup the pathid associated with the concerned path.

Filter Expressions

Filter expressions are expressions of the type "P1[F(P2)]" where P1 is a path expression and F is a filter defined on the relative path P2. An example of a filter expression using the XML documents described above is /PurchaseOrder/Actions/Action[User="King"]. In this example, P1 would correspond to "/PurchaseOrder/Actions/Action" and P2 would correspond to "User." Filter expressions, such as "P1 [F(P2)]", are rewritten, according to one embodiment, to the following SQL:

```
P1[F(P2)] →
  select pt1.pathid, pt1.rid, pt1.order_key, pt1.locator, pt1.value
  from (sql1) pt1
  where exists (select pt2.pathid, pt2.rid, pt2.order_key, pt2.locator,
                pt2.value
         from (sql2) pt2
         where pt2.order_key > pt1.order_key and
               pt2.order_key < maxkey(pt1.order_key) and
               pt1.rid = pt2.rid)
``` where sql1 and sql2 represent the SQL generated for evaluating P1 and P1/P2, respectively. Maxkey( ) is an internal function that takes an order key of a node as input and generates a key that is greater than the key of any descendant of the input order key.

An example of a filter expression that conforms to this template is /Po[id="1"]. In this example, /Po corresponds to P1 of the template, "id" corresponds to P2 of the template, and "=1" corresponds to F of the template. Thus, in this example:
  sql1 is the SQL generated, by application of the other rules described herein, for evaluating the path expression /Po;
  Similarly, sql2 is the SQL generated, by application of the other rules described herein, for evaluating the path expression /Po/id In this example, both P1 (i.e./Po) and P1/P2 (i.e./Po/id) are simple path expressions. Therefore, the rule for simple path expressions, described above, would be used to determine the SQL for sql1 and sql2.

For the purpose of explanation, the rows produced by sql1 shall be referred to herein as the sql1 rows. Similarly, the rows produced by sql2 shall be referred to herein as the sql2 rows. The sql generated by the rule of this template, therefore, selects from the sql1 rows only those rows that have an order key corresponding to nodes that are ancestors (parents) of nodes returned by sql2.

Descendant Axis Expressions

Descendant axis expressions are expressions of the type "P1//P2" where P1 and P2 are path expressions. A simple example of a descendant axis expression is /PurchaseOrder//User, which selects all the User elements that are descendants (whether a child element, grandchild element, etc.) of the PurchaseOrder element. Descendant axis expressions are rewritten, according to one embodiment, using the SQL shown below:

```
P1//P2 →
  select pt2.pathid, pt2.rid, pt2.order_key, pt2.locator, pt2.value
  from path_table pt2
```

-continued

```
  where pt2.pathid in (select * from sys_xdbpathsuffix(:B1)) and
  exists(select pt1.*
         from (sql) pt1
         where pt2.order_key > pt1.order_key and
               pt2.order_key < maxkey(pt1.order_key) and
               pt1.rid = pt2.rid)
``` where:B1=pathid(P2) in which P2 is a simple path, where sql corresponds to the rewritten SQL for expression P1, and where sys_xdbpathsuffix( ) is a table function that generates path ids corresponding to all nodes whose paths have P2 as a suffix, i.e. all //P2 paths.

Wildcard Expressions

Wildcard expressions are expressions of the type "P1/*/ P2." A simple example of this expression is "/PurchaseOrder/ */Action" which selects all the Action elements that are grandchild elements (and only grandchild elements) of the PurchaseOrder element. Also, it is possible to include multiple wildcards (*) in the expression such as "P1/*/*/*/P2" which indicates that the first element of path P2 is the great-great grandchild of the last element of P1. Wildcard expressions are rewritten, according to one embodiment, using the SQL shown below:

```
P1/*/P2 →
  select pt2.pathid, pt2.rid, pt2.order_key, pt2.locator, pt2.values
  from path_table pt2, (sql) pt1
  where pt2.pathid in (select * from sys_xdbpathsuffix(:B1)) and
  exists(select pt1.*
         from (sql) pt1
         where pt2.order_key > pt1.order_key and
               pt2.order_key < maxkey(pt1.order_key) and
               depth(pt2.order_key) = depth(pt1.order_key)+1 and
               pt1.rid = pt2.rid)
``` where:B1 equals pathid(//P2) in which P2 is a simple expression, where sql corresponds to the rewritten SQL for the expression P1, and where the function depth( ) is an internal function that, given an order key of a node, can compute the depth of the node.

Logical Expressions

Logical expressions are expressions of the type "E1 op E2" where E1 and E2 are expressions and op is either a logical AND or a logical OR. Logical expressions, such as "E1 op E2," are rewritten, according to one embodiment, using the following rule:
  E1 op E2→
  select 1 as value from dual
  where (sql1>0) op (sql2>0)

where sql1 and sql2 represent the SQL generated for E1 and E2, respectively. In this rule, dual is a dummy table that contains no information, but rather is used for proper SQL syntax.

Since E1 and E2 are being combined by a Boolean operator, E1 and E2 should be expressions that produce Boolean values. In the present example, the value 1 is used to represent true, and the value 0 is used to represent false. Thus, the statement "sql1>0" is true if the expression E1 evaluates to 1, and if false if E1 evaluates to 0. Similarly, the statement "sql2>0" is false if the expression E2 evaluates to 1, and is false if E2 evaluates to false.

The predicate "(sql1>0) op (sql2>0)" is therefore TRUE only if either (1) op is "AND" and both E1 and E2 are true, or (2) op is "OR" and at least one of E1 and E2 are true. If the predicate "(sql1>0) op (sql2>0)" is true, then the "select 1" statement causes a 1 to be returned (indicating true). If the predicate "(sql1>0) op (sql2>0)" is false, then nothing is returned.

Relational Expressions

Relational expressions are expressions of the type "E1 op E2" where E1 and E2 are expressions and op is a relational operator that maps to one of =, !=, >, <, etc. Relational expressions are rewritten, according to one embodiment, using the following rule:

E1 op E2→ select (case when a1.value op a2.value then 1 else 0) as value from (sql1) a1, (sql2) a2 where sql1 and sql2 represent the SQL generated by E1 and E2, respectively. If the statement in the case when clause is true, then a one is returned; else, a zero is returned.

Literals

Literals are stand-alone values, such as numbers, strings, and Booleans true and false. Literals are rewritten, according to one embodiment, using the following rules:

Number literal n→ select n as value from dual

String literal s→ select 's' as value from dual

Boolean false( )→ select 0 as value from dual

Boolean true( )→ select 1 as value from dual where dual is a dummy table that contains no information, but rather is used for proper SQL syntax.

Casting Nodesets to Booleans

Another feature that is helpful in translating paths into corresponding SQL for querying the XML index is the casting operator. Nodesets are converted to Booleans in case a cast operator appears in the path expression. For example, a cast operator is implicit in an expression of the form /a[b], which selects all the "a" elements that have a "b" element. In these cases, the following SQL, according to one embodiment, is used to generate a Boolean:

/a[b]→ select count(*) as value from (sql)

where sql is the SQL generated from path "/a/b", and where count( ) is an internal function that counts the number of nodes that are returned from sql. If the number of nodes is greater than zero, this SQL statement will return a positive value, else it will return a zero.

Text Function

Another useful expression to be converted to SQL is the text function. Expressions of the form "P1/text( )" are rewritten, according to one embodiment, to the following SQL expression:

P1/text( )→ select pt.value from (sql) pt where sql is the rewritten SQL corresponding to path P1.

Translation of SQL/XML Constructs

To further utilize the benefit of an XML index, it would be wise, not only to translate path expressions into SQL for querying the XML index, but also to allow for the translation of SQL/XML constructs to be applied against the XML index. This would allow for more user friendly SQL coding. Therefore, in another embodiment of the invention, there are four SQL/XML constructs that are translated which include the existsNode, extractValue, extract, and XMLSequence operators. The invention is not limited to the specific examples given hereafter corresponding to each SQL/XML construct. Each translation of the following SQL/XML constructs illustrates one way such translation may be performed.

Existsnode Operator

The existsNode operator determines whether a particular node, specified by an path, exists in an XML document. If the node is located in an XML document, and consequently in the XML index, then a "1", signifying true, is returned. The existsNode operator is rewritten, according to one embodiment, using the following rule:

```
select . . .
from xmltab T
where existsNode(value(T), P) = 1
→
select . . .
from xmltab T
where exists (select 1
    from (sql) Q
    where Q.rid = T.rowid)
``` where sql is the SQL obtained after applying the rules, defined in the previous sections, on the path expression P, and where xmltab is the base table that contains the XML documents. This rule states in the where clause that the row id of the base table, where the XML document is found, is the same as the Rid of at least one tuple in the results indicated by sql. This condition ensures that only the particular document a user is considering is searched. Because the XML index is spanning multiple XML documents, it is important to ensure that only the applicable XML document in the base table is searched, and not all the XML documents in the base table.

Extractvalue Operator

The extractValue operator, given a path expression, returns a single value from the XML index. The extractValue operator is rewritten, according to one embodiment, using the following rule:

```
select extractValue(value(T), P)
from xmltab T
→
select (select Q.value
        from (sql) Q
        where Q.rid = T.rowid)
from xmltab T
``` where sql is the SQL obtained after applying the rules, defined in the previous sections, on the path expression P.

Extract Operator

In contrast to the extractValue operator, the extract operator, given a path expression, is used to generate an XML type tree. The extract operator is rewritten, according to one embodiment, using the following rule:

```
select extract(value(T), P)
from xmltab T
→
select (select xmlagg(get_frag(Q.rid, Q.locator))
        from (sql) Q
        where Q.rid = T.rowid)
from xmltab T
``` where sql is the SQL obtained after applying the rules, defined in the previous sections, on the path expression P, where get_frag is an operator that reads a fragment from the base tables, given a row and a locator, and where xmlagg is an operator that concatenates the fragments generated by the get_frag operator. This rule generates all the rows that are indicated by expression P. For each row, the fragment is retrieved from the base table, T, and aggregated into a single XML type tree. The output of
select extract(value(T), /PurchaseOrder/Actions) from xmltab T
would, for example, have the form:
<Actions>
. . .
. . .
</Actions>

XMLSequence Operator

XMLSequence is an operator that returns a collection of XML instances corresponding to the root elements in the input fragment. For example, XMLSequence(extract(value (T),'/PurchaseOrder/LineItems')) returns a collection of XML instances corresponding to the individual LineItems. The XMLSequence operator is rewritten, according to one embodiment, using the following rule:

```
select . . .
from xmltab T, table(xmlsequence(extract(value(T), P))) T1
where existsNode(value(T1), P1) = 1
→
select . . .
from xmltab T, (select Q.*
               from (sql) Q
               where Q.rid = T.rowid) T1
where exists (select 1
```

-continued

```
              from (sql1) Q1
              where Q1.rid = T1.rid and
                    Q1.order_key > T1.order_key and
                    Q1.order_key < maxkey(T1.order_key) and
                    depth(Q1.order_key) = depth(T1.order_key)+1)
``` where P1 is a path expression, and sql is the SQL obtained after applying the rules, defined in the previous sections, on the path expression P.

In this example, the general existNode rewrite rule described above is not applied because the first operand to the existsNode operator (value(T1)) is generated by operation of the XMLSequence operator.

Query Generation Restrictions

If a query generation happens to fail, the old functional approach described earlier is used. One situation in which a query generation would fail is when a path expression contains constructs for which the conversion rules are not specified. Another situation in which a query generation would fail is when a rewritten SQL does not have the path_table, or xmltab depending on the context, as a top level object in the from clause.

Hardware Overview

Figure 1:
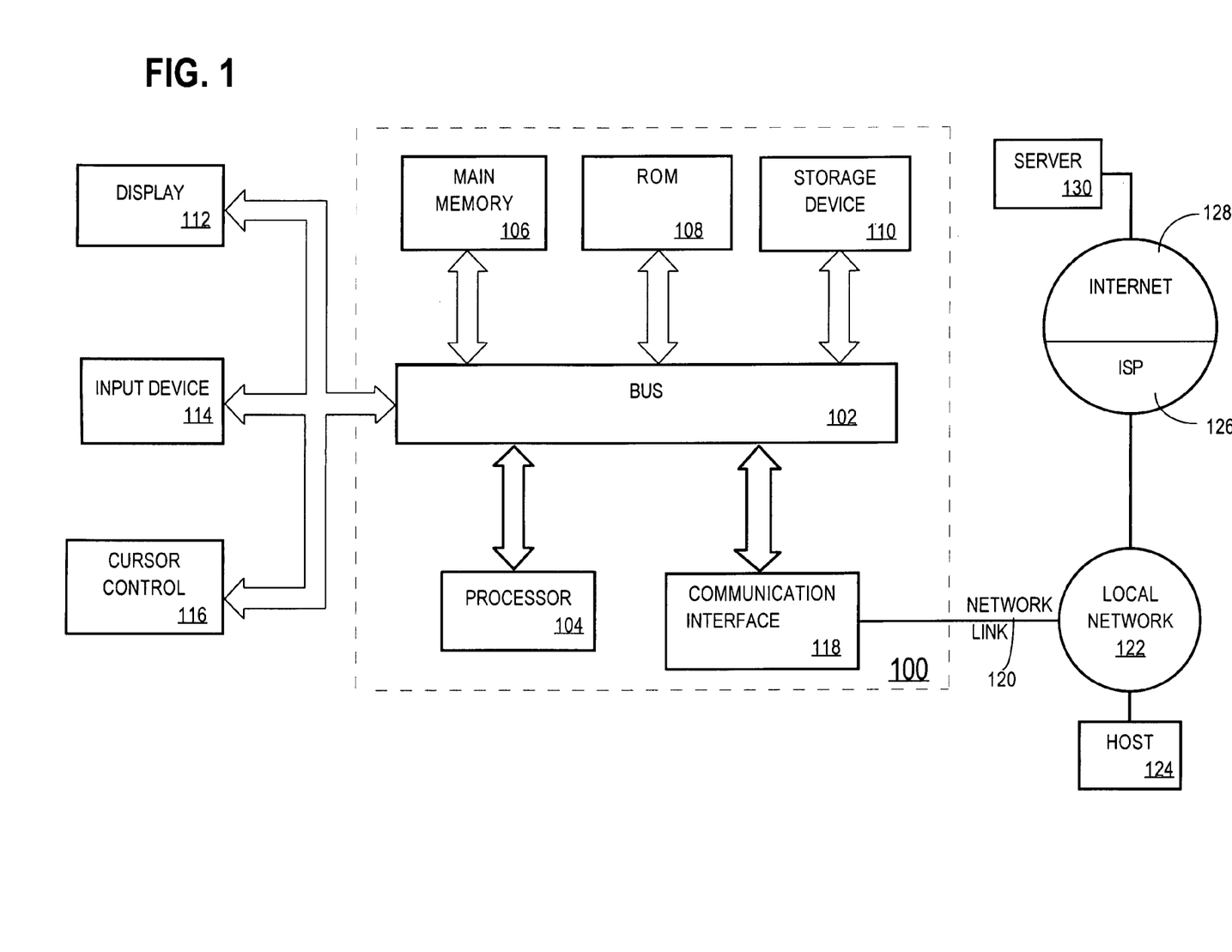
FIG. 1 is a block diagram of a system upon which the techniques described herein may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for implementing the techniques described herein. According to one embodiment of the invention, those techniques are performed by computer system 100 in response to processor 104 executing one or more sequences of one or more instructions contained in main memory 106. Such instructions may be read into main memory 106 from another machine-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 100, various machine-readable media are involved, for example, in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution. In this manner, computer system 100 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for handling path-based queries, the method comprising:

receiving a path-based query that specifies a path associated with data in an XML document;

generating, based on the path, an index-enabled query that accesses an XML index that indexes a plurality of XML documents, including said XML document; and executing the index-enabled query to use said XML index to retrieve said data required by the path-based query;

wherein generating the index-enabled query includes:

identifying a template, of a plurality of available templates, that corresponds to a format of a portion of the path-based query without regard to names of elements in the portion of the path-based query; and generating at least a portion of the index-enabled query based on a rule associated with the template that corresponds to the format of the portion of the path-based query;

wherein each template, within the plurality of templates, corresponds to a different format of path expression;

wherein the rule associated with each template indicates how to translate path expressions that have the format, that corresponds to said each template, to expressions to be used in the index-enabled query.

2. The method of claim 1 wherein the steps of receiving, generating and executing are performed by a relational database server that manages access to the plurality of XML documents.

3. The method of claim 2 wherein:

generating the index-enabled query includes generating a SQL query; and the step of executing the index-enabled query is performed by the relational database server executing the SQL query.

4. A machine-readable storage medium carrying one or more sequences of instructions which, when executed by one or more processors, causes the one or more processors to perform the method recited in claim 2.

5. A machine-readable storage medium carrying one or more sequences of instructions which, when executed by one or more processors, causes the one or more processors to perform the method recited in claim 3.

6. The method of claim 1 wherein:
the template is a first template of the plurality of templates;
the portion of the path-based query includes a subportion;
the step of generating the index-enabled query further includes identifying a second template, of the plurality of templates, that corresponds to the subportion of the path-based query; and
the portion of the index-enabled query that is based on the rule associated with the first template includes query content based on a rule associated with the second template.

7. A machine-readable storage medium carrying one or more sequences of instructions which, when executed by one or more processors, causes the one or more processors to perform the method recited in claim 6.

8. The method of claim 1 wherein:
the portion of the path-based query is a simple path expression;
the step of identifying a template includes identifying a template for simple path expressions; and
the step of generating at least a portion of the index-enabled query based on a rule associated with the template includes generating at least a portion of the index-enable query based on the template for simple path expressions.

9. The method of claim 8 wherein generating at least a portion of the index-enable query based on the template for simple path expressions includes generating query content that selects from the index based on a pathid associated with the simple path expression.

10. A machine-readable storage medium carrying one or more sequences of instructions which, when executed by one or more processors, causes the one or more processors to perform the method recited in claim 8.

11. A machine-readable storage medium carrying one or more sequences of instructions which, when executed by one or more processors, causes the one or more processors to perform the method recited in claim 9.

12. The method of claim 1 wherein:
the portion of the path-based query is a filter expression;
the step of identifying a template includes identifying a template for filter expressions; and
the step of generating at least a portion of the index-enabled query based on a rule associated with the template includes generating at least a portion of the index-enable query based on the template for filter expressions.

13. A machine-readable storage medium carrying one or more sequences of instructions which, when executed by one or more processors, causes the one or more processors to perform the method recited in claim 12.

14. The method of claim 1 wherein:
the portion of the path-based query is a descendant axes expression;
the step of identifying a template includes identifying a template for descendant axes expressions; and
the step of generating at least a portion of the index-enabled query based on a rule associated with the template includes generating at least a portion of the index-enable query based on the template for descendant axes expressions.

15. A machine-readable storage medium carrying one or more sequences of instructions which, when executed by one or more processors, causes the one or more processors to perform the method recited in claim 14.

16. The method of claim 1 wherein:
the portion of the path-based query is a wildcard expression;
the step of identifying a template includes identifying a template for wildcard expressions; and
the step of generating at least a portion of the index-enabled query based on a rule associated with the template includes generating at least a portion of the index-enable query based on the template for wildcard expressions.

17. A machine-readable storage medium carrying one or more sequences of instructions which, when executed by one or more processors, causes the one or more processors to perform the method recited in claim 16.

18. The method of claim 1 wherein:
the portion of the path-based query is a logical expression;
the step of identifying a template includes identifying a template for logical expressions; and
the step of generating at least a portion of the index-enabled query based on a rule associated with the template includes generating at least a portion of the index-enable query based on the template for logical expressions.

19. A machine-readable storage medium carrying one or more sequences of instructions which, when executed by one or more processors, causes the one or more processors to perform the method recited in claim 18.

20. The method of claim 1 wherein:
the portion of the path-based query is a relational expression;
the step of identifying a template includes identifying a template for relational expressions; and
the step of generating at least a portion of the index-enabled query based on a rule associated with the template includes generating at least a portion of the index-enable query based on the template for relational expressions.

21. A machine-readable storage medium carrying one or more sequences of instructions which, when executed by one or more processors, causes the one or more processors to perform the method recited in claim 20.

22. The method of claim 1 wherein:
the portion of the path-based query is a literal;
the step of identifying a template includes identifying a template for literals; and
the step of generating at least a portion of the index-enabled query based on a rule associated with the template includes generating at least a portion of the index-enable query based on the template for literals.

23. A machine-readable storage medium carrying one or more sequences of instructions which, when executed by one or more processors, causes the one or more processors to perform the method recited in claim 22.

24. The method of claim 1 wherein:
the portion of the path-based query is a cast expression;
the step of identifying a template includes identifying a template for cast expressions; and
the step of generating at least a portion of the index-enabled query based on a rule associated with the template includes generating at least a portion of the index-enable query based on the template for cast expressions.

25. A machine-readable storage medium carrying one or more sequences of instructions which, when executed by one or more processors, causes the one or more processors to perform the method recited in claim 24.

26. The method of claim 1 wherein:
the portion of the path-based query is a text function;
the step of identifying a template includes identifying a template for text functions; and
the step of generating at least a portion of the index-enabled query based on a rule associated with the template includes generating at least a portion of the index-enable query based on the template for text functions.

27. A machine-readable storage medium carrying one or more sequences of instructions which, when executed by one or more processors, causes the one or more processors to perform the method recited in claim 26.

28. The method of claim 1 wherein:
the portion of the path-based query includes an operator for determining whether a node in the XML document exists;
the step of identifying a template includes identifying a template associated with said operator; and
the step of generating at least a portion of the index-enabled query based on a rule associated with the template includes generating at least a portion of the index-enable query based on the template associated with said operator.

29. A machine-readable storage medium carrying one or more sequences of instructions which, when executed by one or more processors, causes the one or more processors to perform the method recited in claim 28.

30. The method of claim 1 wherein:
the portion of the path-based query is a an operator for extracting a single value from the XML document;
the step of identifying a template includes identifying a template associated with said operator; and
the step of generating at least a portion of the index-enabled query based on a rule associated with the template includes generating at least a portion of the index-enable query based on the template associated with said operator.

31. A machine-readable storage medium carrying one or more sequences of instructions which, when executed by one or more processors, causes the one or more processors to perform the method recited in claim 30.

32. The method of claim 1 wherein:
the portion of the path-based query is an operator for extracting one or more elements in the XML document;
the step of identifying a template includes identifying a template associated with the operator; and
the step of generating at least a portion of the index-enabled query based on a rule associated with the template includes generating at least a portion of the index-enable query based on the template associated with the operator.

33. A machine-readable storage medium carrying one or more sequences of instructions which, when executed by one or more processors, causes the one or more processors to perform the method recited in claim 32.

34. The method of claim 1 wherein:
the portion of the path-based query is an operator for generating a collection of XML documents corresponding to root elements of an XML fragment;
the step of identifying a template includes identifying a template associated with said operator; and
the step of generating at least a portion of the index-enabled query based on a rule associated with the template includes generating at least a portion of the index-enable query based on the template associated with said operator.

35. A machine-readable storage medium carrying one or more sequences of instructions which, when executed by one or more processors, causes the one or more processors to perform the method recited in claim 34.

36. The method of claim 1, wherein:
the XML index includes a path table;
each row in the path table corresponds to an indexed node in the XML document; and
each row indicates a value for the corresponding indexed node.

37. A machine-readable storage medium carrying one or more sequences of instructions which, when executed by one or more processors, causes the one or more processors to perform the method recited in claim 36.

38. The method of claim 1, wherein:
the XML index includes a path table;
each row in the path table corresponds to an indexed node in the XML document; and
each row indicates a locator that is used to extract a fragment in the XML document that corresponds to the indexed node.

39. A machine-readable storage medium carrying one or more sequences of instructions which, when executed by one or more processors, causes the one or more processors to perform the method recited in claim 38.

40. The method of claim 1, wherein:
the XML index includes a path table;
each row in the path table corresponds to an indexed node in the XML document; and
each row indicates a Dewey order key value that represents hierarchical order information, corresponding to the indexed node, relative to other nodes in the XML document.

41. A machine-readable storage medium carrying one or more sequences of instructions which, when executed by one or more processors, causes the one or more processors to perform the method recited in claim 40.

42. A machine-readable storage medium carrying one or more sequences of instructions which, when executed by one or more processors, causes the one or more processors to perform the method recited in claim 1.

* * * * *

UNITED STATES PATENT AND TRADEMARK OFFICE
CERTIFICATE OF CORRECTION

PATENT NO. : 7,398,265 B2  
APPLICATION NO. : 10/944170  
DATED : July 8, 2008  
INVENTOR(S) : Thusoo et al.

It is certified that error appears in the above-identified patent and that said Letters Patent is hereby corrected as shown below:

On page 2, in column 2, under "Other Publications", line 18, delete "SIGMOND" and insert -- SIGMOD --, therefor.

On page 2, in column 2, under "Other Publications", line 23, delete "Relationship" and insert -- Relational --, therefor.

On page 3, in column 1, under "Other Publications", line 42, delete "Preli minary" and insert -- Preliminary --, therefor.

On page 3, in column 2, under "Other Publications", line 3, delete "12" and insert -- 15 --, therefor.

On page 3, in column 2, under "Other Publications", line 4, delete "XQuey" and insert -- XQuery --, therefor.

On page 3, in column 2, under "Other Publications", line 15, after "2003," insert -- IEEE --.

In column 14, line 32, before "path" delete "an" and insert -- a --, therefor.

In column 21, line 31, in claim 30, after "is" delete "a".

Signed and Sealed this

Tenth Day of November, 2009

David J. Kappos
*Director of the United States Patent and Trademark Office*